Feb. 8, 1949.   C. N. FOUSE ET AL   2,461,206
CRANK CASE VENTILATOR VALVE
Filed June 23, 1948

Inventors
Charles N. Fouse
Walter H. A. Krieg
by Douglas S. Johnson
agent

Patented Feb. 8, 1949

2,461,206

UNITED STATES PATENT OFFICE 2,461,206

CRANKCASE VENTILATOR VALVE

Charles N. Fouse and Walter H. A. Krieg, Preston, Ontario, Canada, assignors to Kralinator Products Limited, Preston, Ontario, Canada Application June 23, 1948, Serial No. 34,694

5 Claims. (Cl. 123—119)

This invention relates to fluid control valves and more particularly to crank case ventilator valves for internal combustion engines and the principal object of the invention is to provide an improved and efficient valve structure which will automatically function in response to vacuum conditions in the intake manifold to provide the desired crank case ventilation and which will be self-cleaning during operation precluding "freezing" of the moving valve element, enabling the valve to function indefinitely without attention.

A further important object is to provide a valve structure which will eliminate difficult and expensive machining operations enabling the valve to be economically manufactured.

A still further object is to provide a valve which will be easy to install.

The principal feature of the invention consists in arranging a ball valve between a pair of valve discs mounted in a valve chamber in communication at opposite ends with the crank case and intake manifold respectively, and providing each of the discs with a central opening forming a valve seat for the ball and with reduced eccentric opening by-passing the central opening and providing increased peripheral flow at one side of the ball valve to spin the ball during its valving operation to prevent contaminating deposits from collecting on the periphery thereof or on the walls of the valve chamber.

A further important feature consists in arranging the ball valve to seat against one of the discs during zero manifold vacuum with the engine stopped and to seat against the other disc during maximum manifold vacuum with the engine idling to provide minimum crank case valve opening during starting and idling, ensuring high manifold vacuum and leaving the carburetion unimpaired.

Referring to the accompanying drawings, Figure 1 is a part sectional part elevational view of an engine illustrating the manner in which our ventilator valve unit is connected between the crank case and intake manifold.

It has been found in practice that crank case ventilation is very desirable in internal combustion engines. With proper ventilation the crank case atmosphere is prevented from becoming super-saturated with contaminating materials in the blow-by gases or those formed as the result of oil deterioration by removing the contaminating materials and thus eliminating the inherent harmful effects, such as rust, corrosion and improper lubrication occasioned thereby.

Previous forms of valves proposed for use in crank case ventilation have had the disadvantages that they are unable to regulate the ventilation accurately in accordance with the engine operation and further, they soon become inoperative due to the collecting of the contaminating material removed from the crank case on the valving elements.

Invariably in previously proposed crank case valves it has been necessary to remove and clean the valve at frequent intervals to maintain the valving operation.

One of the principal features of the present invention accordingly resides in the fact that the present valve structure eliminates the accumulating of contaminating material on the valving elements and extends the valve operation indefinitely without requirement of continual attention and cleaning.

In addition the present structure provides a valve which will be extremely sensitive and will provide the direct ventilation in accordance with the engine operation, increasing ventilation during operating conditions which increase crank case gases.

Figure 1:
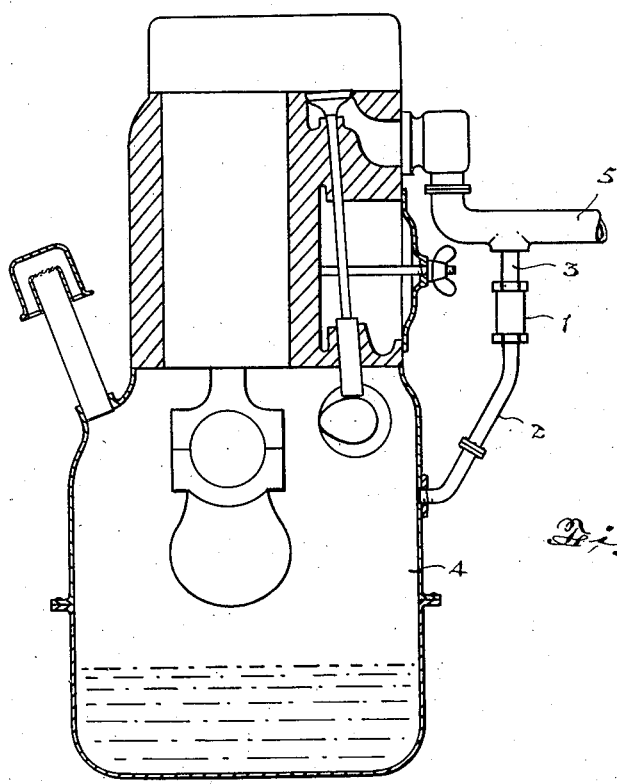
Figure 4:
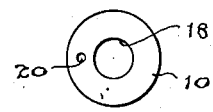
Figure 4 is a plan view of one of the discs.

Referring to the accompanying drawings, Figure 1 shows the manner in which the valve unit, generally designated at 1, is connected through the pipes 2 and 3 with the interior of the crank case 4 and the intake manifold 5 respectively.

Figures 2, 3:
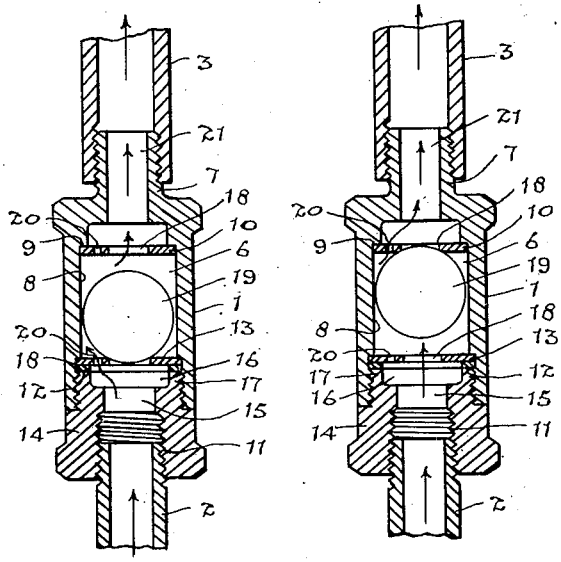
Figure 2 is a vertical mid-sectional view of a valve structure embodying our invention and illustrating the ball valve seating against the lower disc corresponding to zero or low manifold vacuum.
Figure 3 is a view similar to Figure 2 but showing the ball valve seating against the upper disc corresponding to high manifold vacuum.

Referring to Figures 2 and 3 for the details of the valve 1, it will be seen that the valve chamber comprises a cylinder 6 having a reduced extension 7 which is threaded to engage the pipe 3. The cylinder 6 is provided with an enlarged bore 8 which defines an annular shoulder 9 adjacent the upper end thereof against which seats a disc 10.

The lower end of the cylinder is provided with a further enlarged internally threaded bore which defines the second annular shoulder 12 against which seats a second disc 13 held in place by a threaded plug 14 having a central bore 15 which is threaded at 11 to receive the pipe 2. The inner end of the plug 14 is provided with an enlarged counterbore 16 providing a relatively thin annular wall 17 in contact with the disc 13.

Each of the discs 10 and 13 is provided with an enlarged central opening 18 forming a valve seat for the ball valve 19 arranged between the discs.

In addition to the central opening 18 each disc is provided with a small eccentric orifice 20, the discs being arranged so that the eccentric orifices 20 are substantially in alignment.

The distance between the discs 10 and 13 is substantially greater than the diameter of the ball which in turn is slightly less than the internal diameter of the enlarged bore 8 of the cylinder forming the valve chamber.

The purpose of the eccentric orifices 20 is to provide a flow of gas past one side of the ball valve to create an unbalance in the pressure flow past the ball to impart a spinning motion thereto. This spinning motion serves to provide a positive wiping action between the periphery of the ball and the wall of the valve chamber and the surface of the discs 10 and 13.

Since this air flow through the orifices 20 is maintained independent of the position of the valve or the flow through the valve seat openings 18, there will always be an unbalance in fluid pressure in the fluid flow around the valve to impart the spinning motion to the ball independent of its position.

Thus the valve will be self-cleaning under all engine speeds whether the engine is merely idling or operating under full load.

In operation with the engine dead due to the vertical position of the cylinder 6 the ball valve 19 will be seated on the lower disc 13, closing the central opening 18. Thus at the instant of starting the crank case and intake manifold are in communication only through the small orifice 20 in the lower disc.

Under open throttle starting conditions when the manifold vacuum is low the ball valve will be raised off the lower disc but the vacuum in the manifold will not be sufficient to raise it against the upper disc. Thus gases from the crank case flow up the pipe 2 through the central disc openings 18 around the ball valve and also through the eccentric disc orifices 20 around the ball valve, through the bore 21 of the reduced cylinder extension 7 and through the pipe 3 to the intake manifold.

Thus under starting conditions when large volumes of crank case gases are being produced the ball-valve is floatingly retained between the discs and maximum valve opening is provided to enable the large volume of gases to be drawn off.

Similarly under accelerating conditions when again the vacuum is relatively low the ball valve will float between the two discs providing maximum valve opening to draw off the excess of gases produced under the accelerating conditions.

It will be noted as emphasized before that in addition to the normal balanced flow of gases around the ball is permitted by the central openings 18 of the discs there will be a flow through the eccentric orifices 20, providing an unbalance in the fluid pressure to spin the ball.

Under idling conditions the vacuum will be high and the ball valve will be raised to seat against the upper disc, reducing ventilating flow through the eccentric orifice 20 of the upper disc only. The reduced valve opening operates to draw out the small volume of gases produced during idling yet leaves the manifold vacuum unimpaired and proper carburetion may be obtained.

Under normal road load conditions the manifold vacuum will be somewhat less than under idling conditions but the ball valve will be maintained adjacent the upper disc, reducing the valving passage below maximum opening required for starting and accelerating.

From the foregoing it will be appreciated that the valve will function effectively to provide the desired ventilation in accordance with the engine operation and crank case gases produced and will be self-cleaning, completely eliminating the accumulation of contaminating deposits on the valving surfaces which would clog or "freeze" the valve, rendering it inoperative. The valve may thus be used for extensive periods without requiring maintenance or attention.

It will be further appreciated that the valve will be inexpensive to manufacture and can be readily assembled and installed on all types of internal combustion engines.

What we claim as our invention is:

1. A crank case ventilator valve comprising a valve chamber, a pair of discs supported in said chamber in spaced relation and each provided with a central opening therethrough, a ball valve arranged between said discs and adapted to seat against said openings, at least one of said discs having an eccentric orifice to provide an unequal fluid flow around the periphery of said ball valve to effect the spinning of said ball.

2. A crank case ventilator valve, comprising a cylindrical valve chamber adapted to communicate at opposite ends with the crank case and intake manifold respectively, a pair of discs arranged in said chamber and formed with central openings forming valve seats, a ball valve arranged between said discs and movable under varying conditions of manifold vacuum to operate between said valve seats, openings formed in said discs eccentric to said valve seat opening permitting increased fluid flow past one portion of the surface of said ball valve to spin said ball providing a wiping action to maintain the valving surfaces in a clean condition.

3. A valve for controlling fluid flow comprising a cylindrical valve chamber, a pair of discs supported in spaced relation in said chamber, a ball valve arranged between said discs, said discs each having a central opening therethrough forming a valve seat for said ball valve, openings in said discs eccentric to said central openings permitting eccentric fluid flow past one portion of the surface of said ball valve to provide an unbalanced fluid flow around the periphery of said ball valve to impart a spinning movement to said ball.

4. A crank case ventilator valve for connection between the crank case and intake manifold of an internal combustion engine, comprising a vertical cylindrical valve chamber adapted to communicate at the lower end with the crank case and at the upper end with the intake manifold, a pair of discs arranged in said chamber and formed with central openings forming valve seats, a ball valve arranged between said discs and normally seating against said valve seat opening in the lower disc under zero manifold vacuum conditions and adapted to rise and seat against said valve opening in the upper disc under high manifold vacuum, said discs having eccentric substantially aligned openings therethrough permitting at all times eccentric fluid flow past one portion of the periphery of said ball valve to create a fluid unbalance to spin said ball.

5. A crank case ventilator valve comprising a cylindrical valve chamber adapted to communicate at opposite ends with the crank case and intake manifold respectively, a pair of spaced annular shoulders formed within said chamber, a pair of discs each having a central valve seat opening and an eccentric orifice therethrough abutting said shoulders, the eccentric orifices in said discs being substantially in alignment, and a ball valve arranged between said discs.

CHARLES N. FOUSE.
WALTER H. A. KRIEG.

No references cited.